US012754004B2

United States Patent

(12) United States Patent
Chang et al.

(10) Patent No.: US 12,754,004 B2
(45) Date of Patent: Oct. 6, 2026

(54) WHEEL BLANK INSPECTION DEVICE

(71) Applicant: INDUSTRIAL TECHNOLOGY RESEARCH INSTITUTE, Hsinchu (TW)

(72) Inventors: Chin-Chia Chang, Tainan City (TW); Chia-Ming Tsai, Tainan City (TW); Yi-Tong Liu, New Taipei City (TW); Chien-Hsun Wu, Tainan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 351 days.

(21) Appl. No.: 18/651,502

(22) Filed: Apr. 30, 2024

(65) Prior Publication Data

US 2025/0207902 A1 Jun. 26, 2025

(30) Foreign Application Priority Data

Dec. 20, 2023 (TW) ................................ 112149824

(51) Int. Cl.
*G01B 5/00* (2006.01)
*G01B 11/22* (2006.01)

(52) U.S. Cl.
CPC ............ *G01B 5/0025* (2013.01); *G01B 11/22* (2013.01)

(58) Field of Classification Search
CPC .............................. G01B 5/0025; G01B 11/08
(Continued)

(56) References Cited

U.S. PATENT DOCUMENTS 8,943,880 B2 * 2/2015 Vignoli ............... G01M 17/013 73/146
10,495,451 B2 12/2019 Lu et al.
(Continued)

FOREIGN PATENT DOCUMENTS

CN 1938123 A 3/2007
CN 101124454 A 2/2008
(Continued)

OTHER PUBLICATIONS

Son, S. et al., "Automated laser scanning system for reverse engineering and inspection," International Journal of Machine Tools & Manufacture, vol. 42, pp. 889-897 (2002).
(Continued)

*Primary Examiner* — George B Bennett
(74) *Attorney, Agent, or Firm* — Maschoff Brennan

(57) ABSTRACT

A wheel blank inspection device is for inspecting a wheel blank and includes a depth sensor and a computing control module electrically connected to the depth sensor. The computing control module executes a path acquisition process, a depth measurement process and a load point localization process. The path acquisition process is controlling the depth sensor to scan the wheel blank, obtaining a center fitted to a flange of the wheel blank, and calculating at least one detection path based on the center. The depth measurement process is controlling the depth sensor to scan the flange of the wheel blank according to the at least one detection path to capture depth values of the flange. The load point localization process is obtaining load points and information of relative positions of the load points with respect to a reference point of the wheel blank based on the depth values.

20 Claims, 13 Drawing Sheets

(58) Field of Classification Search
USPC ............................ 33/1 BB, 203, 203.12, 288
See application file for complete search history.

(56) References Cited

U.S. PATENT DOCUMENTS

| | | | | |
|---|---|---|---|---|
| 10,533,847 | B2 * | 1/2020 | Su | G01Q 10/04 |
| 10,571,240 | B2 | 2/2020 | Liu et al. | |
| 11,047,668 | B2 * | 6/2021 | Xu | G01B 21/16 |
| 11,243,061 | B2 * | 2/2022 | Wu | G01B 5/12 |
| 11,644,296 | B1 | 5/2023 | Chang et al. | |
| 11,796,295 | B2 * | 10/2023 | Li | G01B 11/2408 |
| 11,808,560 | B2 | 11/2023 | Chen et al. | |
| 2007/0222133 | A1 | 9/2007 | Sammartin | |
| 2008/0297777 | A1 | 12/2008 | Sotgiu | |
| 2019/0195611 | A1 * | 6/2019 | Liu | G01B 5/20 |
| 2020/0406679 | A1 | 12/2020 | Liu et al. | |
| 2021/0154785 | A1 | 5/2021 | Cai et al. | |

FOREIGN PATENT DOCUMENTS

| | | | |
|---|---|---|---|
| CN | 105058138 | A | 11/2015 |
| CN | 106295936 | A | 1/2017 |
| CN | 110977617 | A | 4/2020 |
| EP | 1 830 157 | A1 | 9/2007 |
| TW | M509894 | U | 10/2015 |
| TW | M548035 | U | 9/2017 |
| TW | 201821760 | A | 6/2018 |
| TW | I632342 | B | 8/2018 |
| TW | M565136 | U | 8/2018 |
| TW | I667529 | B | 8/2019 |
| TW | I692635 | B | 5/2020 |
| TW | I739693 | B | 9/2021 |
| TW | 202204882 | A | 2/2022 |
| TW | I806294 | B | 6/2023 |

OTHER PUBLICATIONS

Li, T. et al., "An Online Wheel Size detecting Technology Based on Laser Displacement Sensors for Urban Rail Vehicles," Proceedings of the 36th Chinese Control Conference, pp. 9983-9987 (2017).

Xiao, S. et al., "Research on Flatness Measurement of Large-Size Parts Based on 3-D Machine Vision," IEEE Transactions on Instrumentation and Measurement, vol. 72 (2023).

TW Notice of Allowance dated Nov. 1, 2024 in application 112149824.

* cited by examiner

WHEEL BLANK INSPECTION DEVICE

This non-provisional application claims priority under 35 U.S.C. § 119(a) on patent application No(s). 112149824 filed in Taiwan, R.O.C. on Dec. 20, 2023, the entire contents of which are hereby incorporated by reference.

TECHNICAL FIELD

The disclosure relates to a wheel blank inspection device.

BACKGROUND

Vehicles, such as automobiles, operate through the rotation of tires. Tires are divided into wheel rims and tire bodies. The manufacturing method of wheel rims usually includes the production of tire blanks and the refinement of the tire blanks at multiple processing stations from rough to fine processing. The finely processed wheel rims are then combined with the tire bodies to make tires.

SUMMARY

One embodiment of the disclosure provides a wheel blank inspection device for inspecting a wheel blank, including a depth sensor and a computing control module electrically connected to the depth sensor. The computing control module is configured to execute a path acquisition process, a depth measurement process and a load point localization process. The path acquisition process is controlling the depth sensor to scan the wheel blank, obtaining a center fitted to a flange of the wheel blank, and calculating at least one detection path based on the center. The depth measurement process is controlling the depth sensor to scan the flange of the wheel blank according to the at least one detection path to capture a plurality of depth values of the flange. The load point localization process is obtaining a plurality of load points and information of a plurality of relative positions of the load points with respect to a reference point of the wheel blank based on the depth values.

The above descriptions in the summary and the following detailed descriptions are used to demonstrate and explain the spirit and principle of the disclosure and provide a further explanation of the scope of claims of the disclosure.

BRIEF DESCRIPTION OF THE DRAWINGS

The disclosure will become better understood from the detailed description given hereinbelow and the accompanying drawings which are given by way of illustration only and thus are not intending to limit the disclosure and wherein.

DETAILED DESCRIPTION

Figure 1:
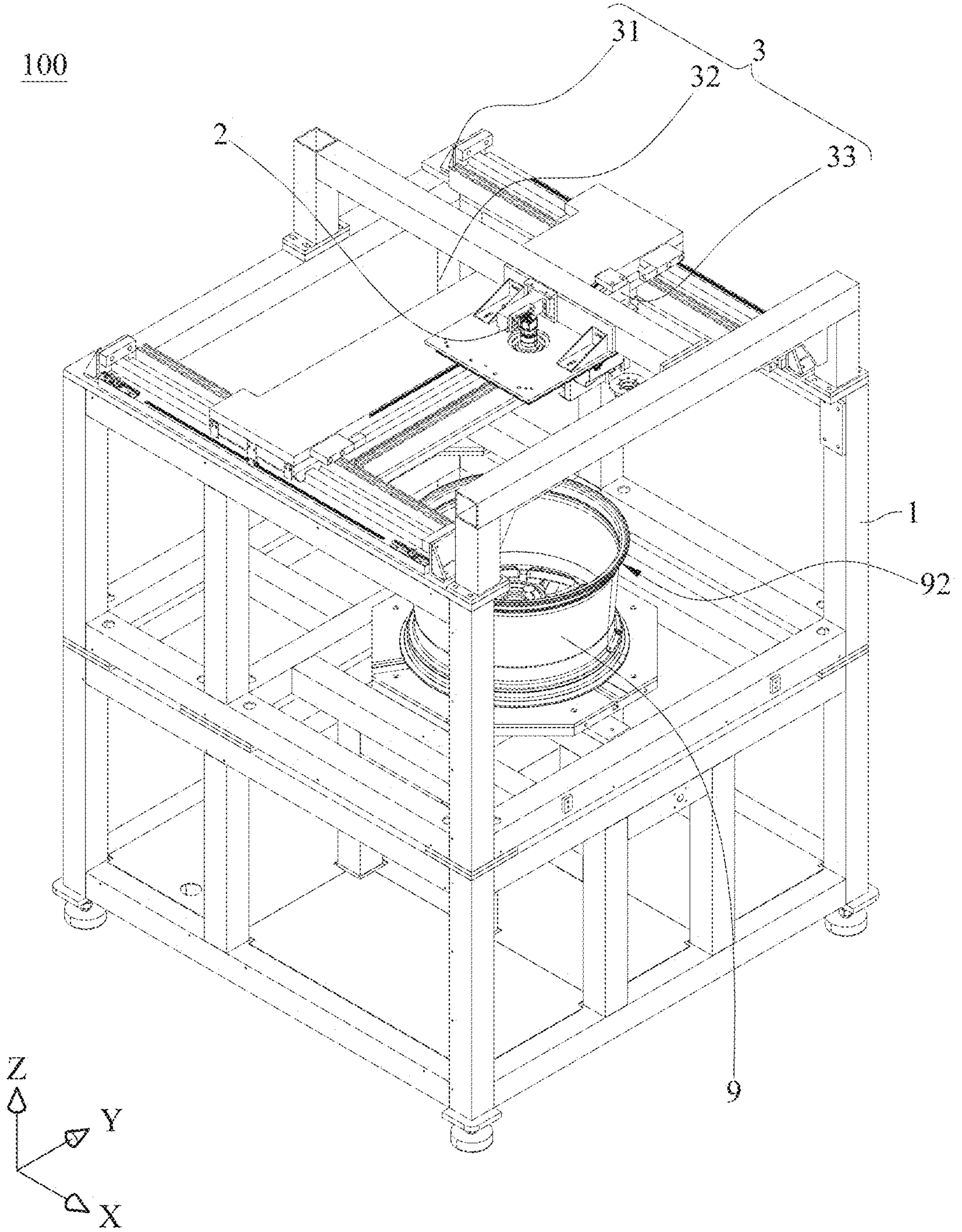
FIG. 1 is a schematic perspective view of a wheel blank inspection device according to one embodiment of the disclosure.

Features and advantages of embodiments of the disclosure are described in the following detailed description, it allows the person skilled in the art to understand the technical contents of the embodiments of the disclosure and implement them, and the person skilled in the art can easily comprehend the purposes of the advantages of the disclosure. The following embodiments are further illustrating the perspective of the disclosure, but not intending to limit the disclosure.

The drawings may not be drawn to actual size or scale, some exaggerations may be necessary in order to emphasize basic structural relationships, while some are simplified for clarity of understanding, but the disclosure is not limited thereto. It is allowed to have various adjustments under the spirit of the disclosure. In addition, the spatially relative terms, such as "up", "top", "above", "down", "low", "left", "right", "front", "rear", and "back" and the like, may be used herein for ease of description to describe the relationship of one element or feature to another element(s) of feature(s) as illustrated in the drawings. It will be understood that the spatially relative terms are intended to encompass orientations of the element or feature but not intended to limit the disclosure.

Figure 2:
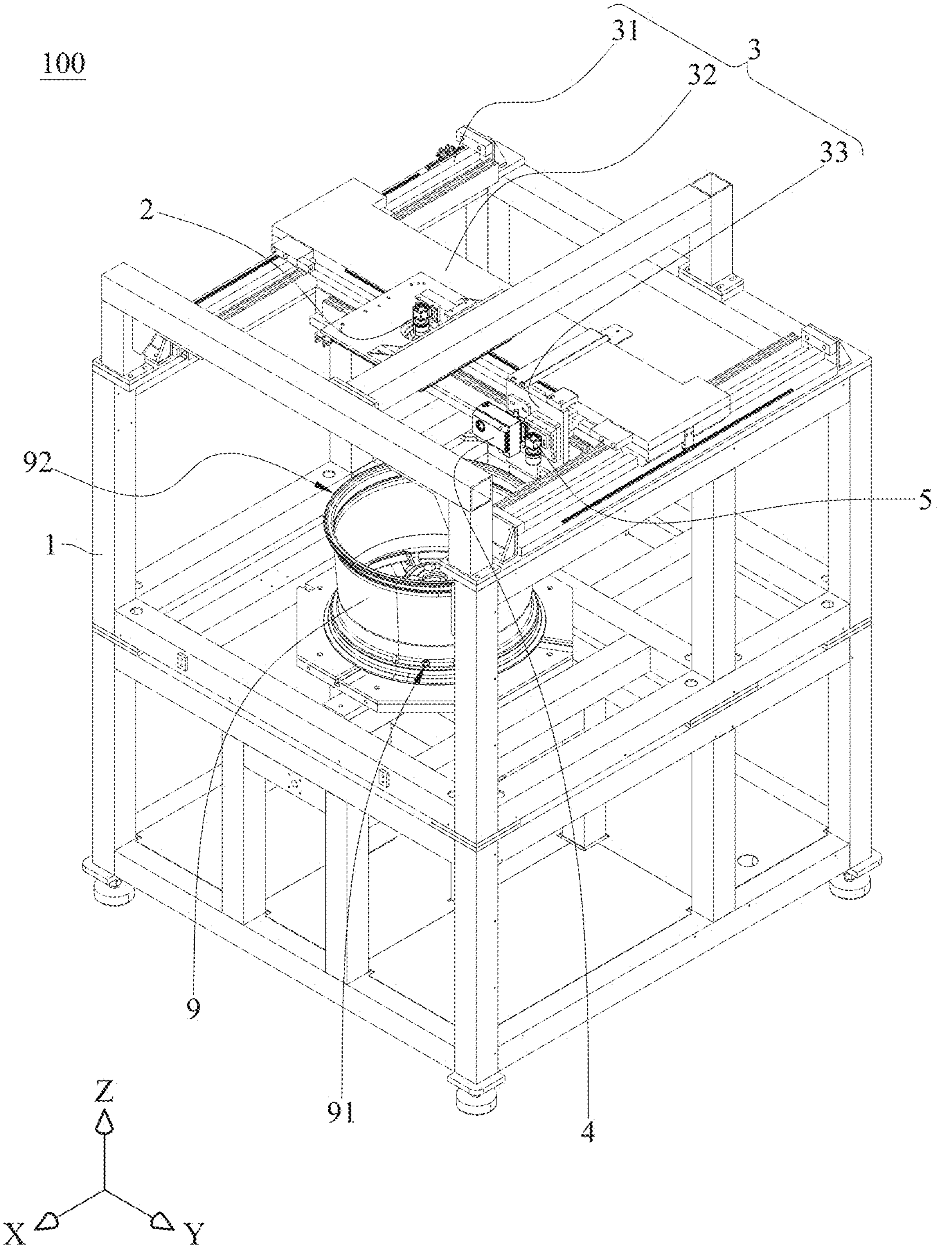
FIG. 2 is another schematic perspective view of the wheel blank inspection device in FIG. 1.
Figure 3:
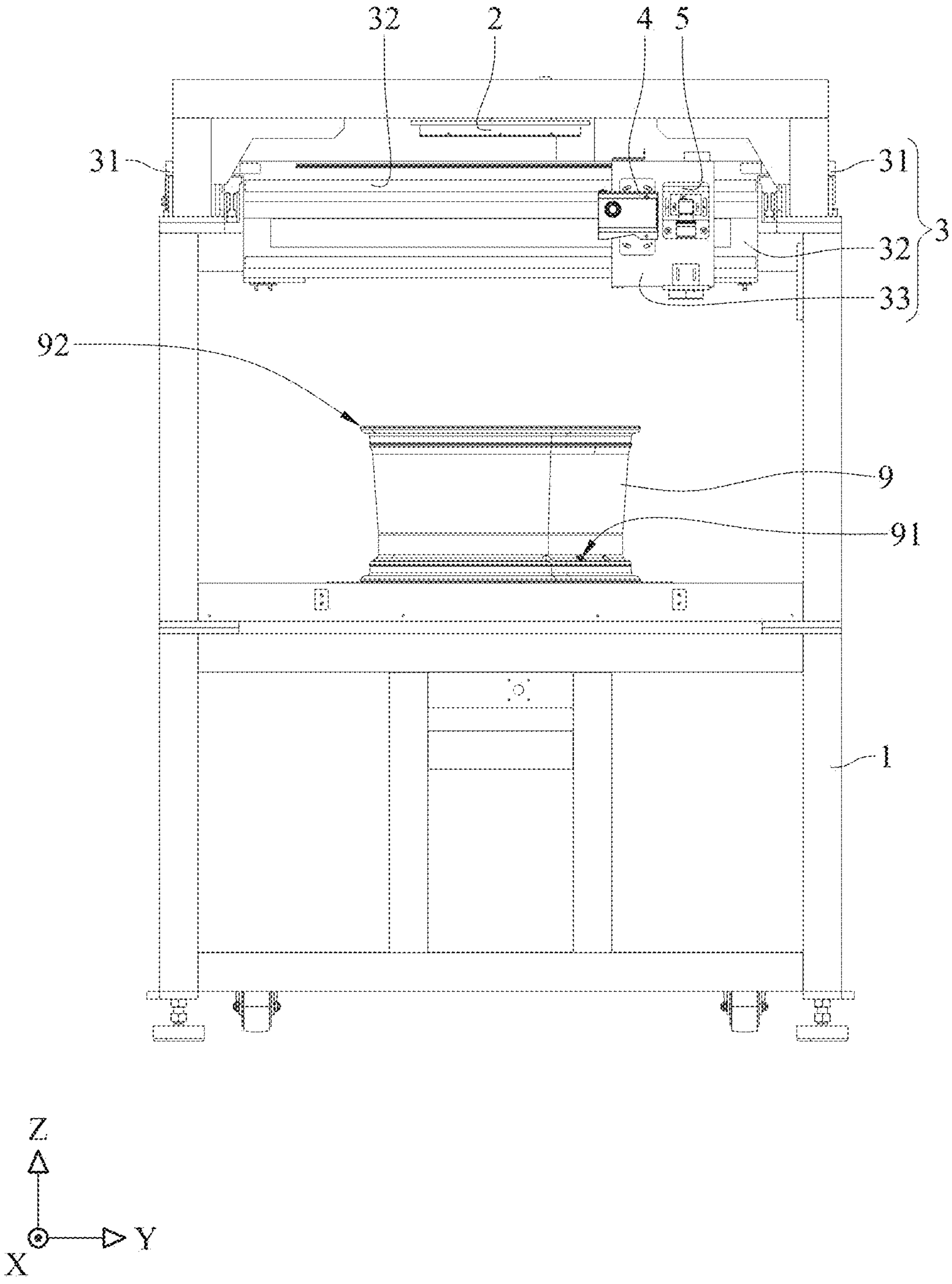
FIG. 3 is a schematic front view of the wheel blank inspection device in FIG. 1.
Figure 4:
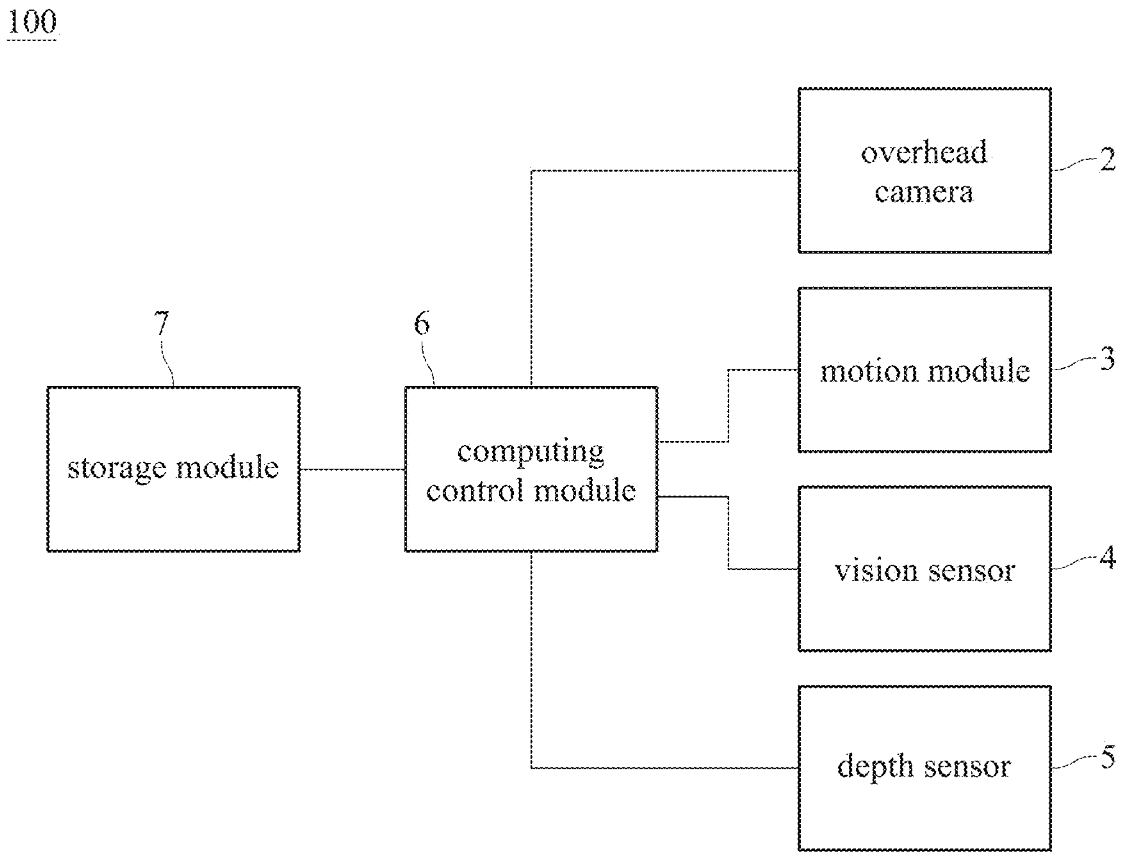
FIG. 4 is a schematic block diagram of the wheel blank inspection device in FIG. 1.

Please refer to FIG. 1 to FIG. 4. FIG. 1 FIG. 1 is a schematic perspective view of a wheel blank inspection device according to one embodiment of the disclosure. FIG. 2 is another schematic perspective view of the wheel blank inspection device in FIG. 1. FIG. 3 is a schematic front view of the wheel blank inspection device in FIG. 1. FIG. 4 is a schematic block diagram of the wheel blank inspection device in FIG. 1.

As shown in FIG. 1, FIG. 2 and FIG. 3, the wheel blank inspection device 100 includes: a frame 1, an overhead camera 2, a motion module 3, a vision sensor 4 and a depth sensor 5.

The frame 1 is for accommodating a wheel blank 9. The wheel blank 9 has a reference point 91 and a flange 92. The overhead camera 2 is disposed on the frame 1. The overhead camera 2 is disposed facing toward the wheel blank 9 for capturing images. The overhead camera 2 is for sensing the wheel blank 9 to obtain an image. In this embodiment, the overhead camera 2 is fixed on the frame 1. A field of view of the overhead camera 2 is sufficient to capture the entire wheel blank 9 in a single image.

The motion module 3 is disposed on the frame 1. The motion module 3 includes a first direction rail 31, a second direction rail 32 and a movement base 33. The first direction rail 31 is fixed on the frame 1. The second direction rail 32 is disposed on the first direction rail 31 and slidable along the first direction rail 31. The movement base 33 is disposed on the second direction rail 32 and slidable along the second direction rail 32. In this embodiment, the first direction rail 31 and the second direction rail 32 both horizontally extend, and the first direction rail 31 and the second direction rail 32 are substantially orthogonal to each other. The first direction rail 31 extends in an X direction. The second direction rail 32 extends in a Y direction.

The vision sensor 4 and the depth sensor 5 are disposed on the movement base 33. The vision sensor 4 and the depth sensor 5 may move relative to the frame 1 with the motion module 3. A field of view of the vision sensor 4 may be smaller than the field of view of the overhead camera 2. The field of view of the vision sensor 4 may be larger than a field of view of the depth sensor 5. In this embodiment, the depth sensor 5 may be a laser displacement meter or an optical rangefinder. The depth sensor 5 may use a camera with fewer pixels than those of the vision sensor 4 for imaging small areas, thereby reducing the cost of the wheel blank inspection device 100.

As shown in FIG. 2 and FIG. 4, the wheel blank inspection device 100 further includes a computing control module 6 and a storage module 7. The computing control module 6 is electrically connected to the overhead camera 2, the motion module 3, the vision sensor 4, the depth sensor 5 and the storage module 7. The computing control module 6 may be a processor of a computer, and the storage module 7 may be a hard drive of the computer, a flash drive electrically connected to the computer or a computer-readable optical disk, magnetic disk or memory card, etc.

The storage module 7 stores information of a plurality of wheel models of various wheel blanks. The information of each of the wheel models may at least include the wheel model, a distance between a valve hole and an axis corresponding to the wheel model, and a distance between the flange and the axis. In addition, the storage module 7 may further store information such as presence or absence of the valve hole corresponding to the wheel model, a diameter of the flange 92, a height of the flange 92, a required shift offset SH of the vision sensor 4 when detecting the reference point (described later with FIG. 9).

The computing control module 6 may determine and obtain one of the wheel models corresponding to the wheel blank 9 based on the image of the wheel blank 9 obtained and sensed by the overhead camera 2 and the model information stored in the storage module 7.

The computing control module 6 may collaborate with the motion module 3 and the depth sensor 5 to perform a path acquisition process. The computing control module 6 may collaborate with the motion module 3 and the vision sensor 4 to perform a reference point setting process. The computing control module 6 may collaborate with the motion module 3 and the depth sensor 5 to perform a depth measurement process. The computing control module 6 may perform a load point localization process.

Figure 5:
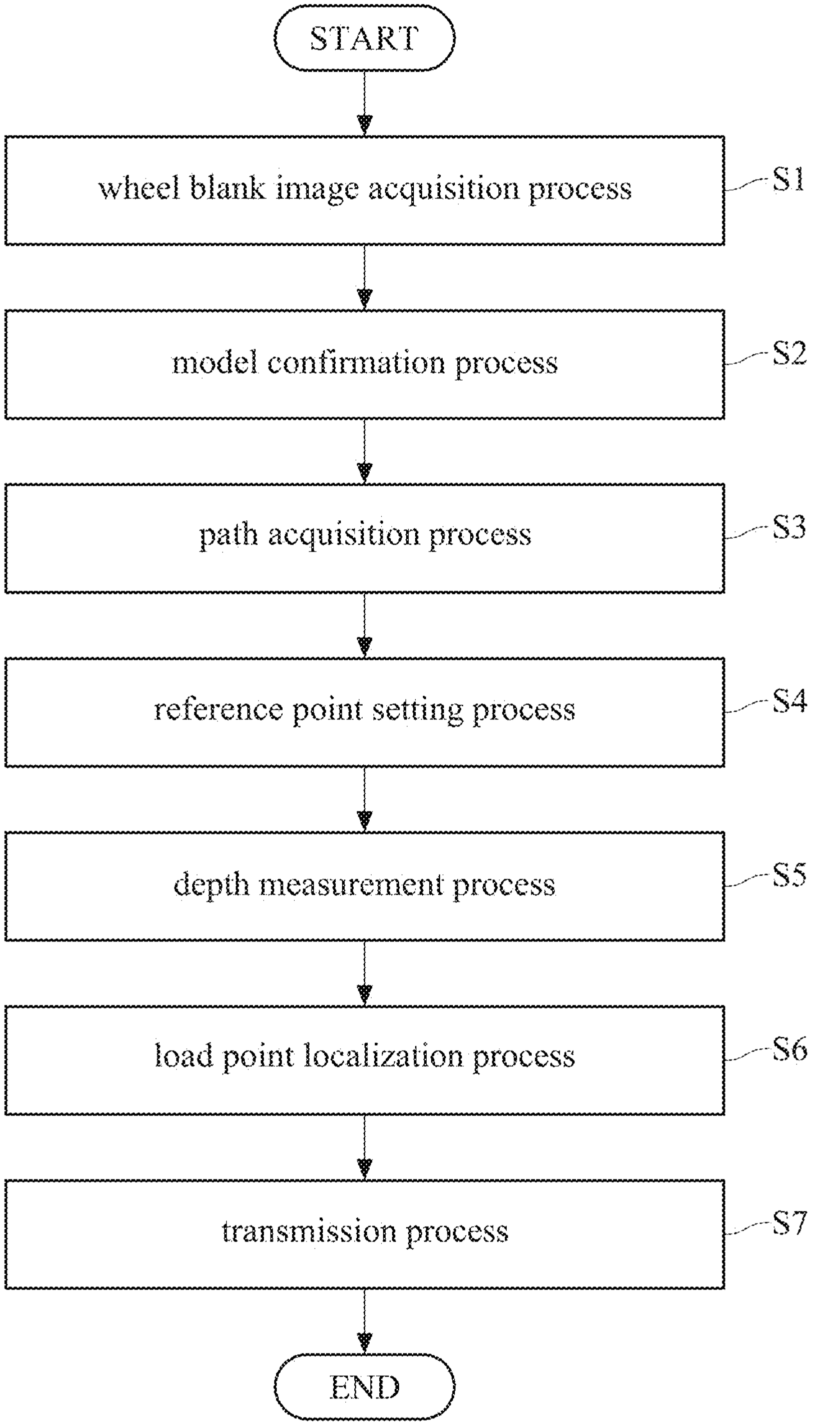
FIG. 5 is a flow chart of a wheel blank inspection method executed by the wheel blank inspection device shown in FIG. 4.
Figure 6:
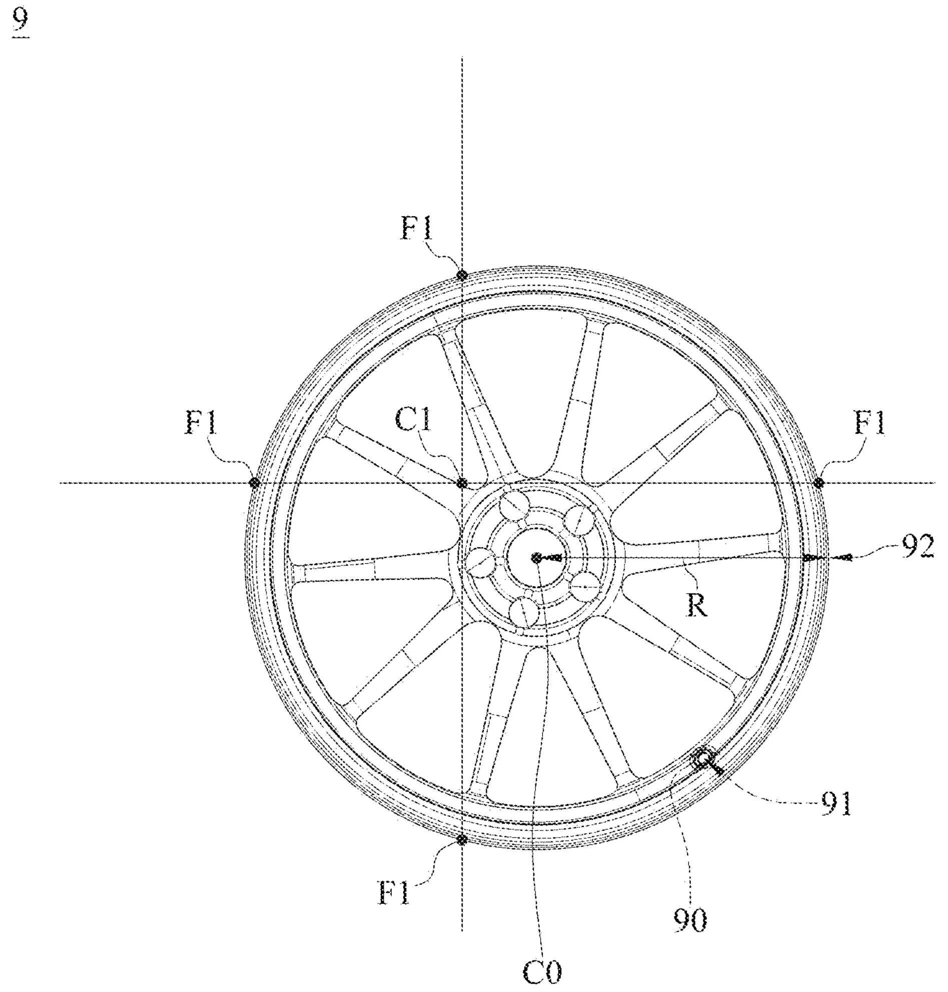
FIG. 6 is a schematic top view of a wheel blank.
Figure 7:
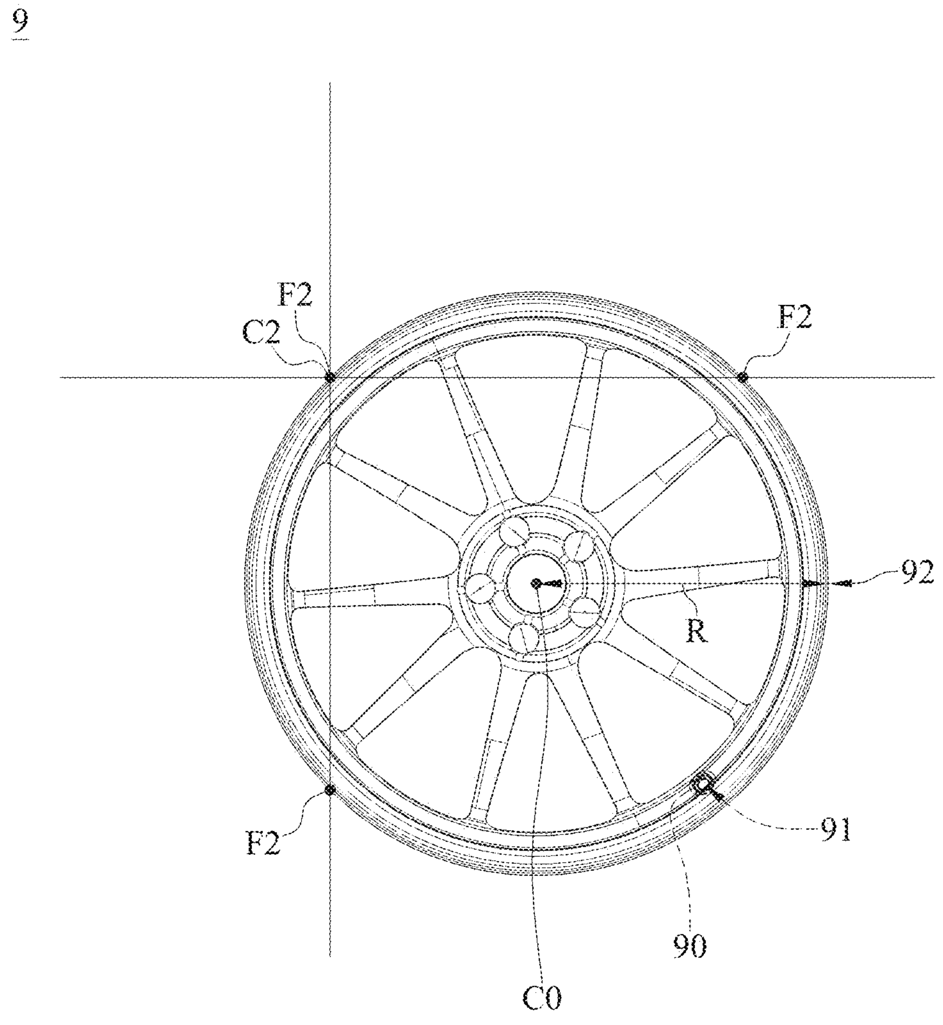
FIG. 7 is a schematic top view of a wheel blank.
Figure 8:
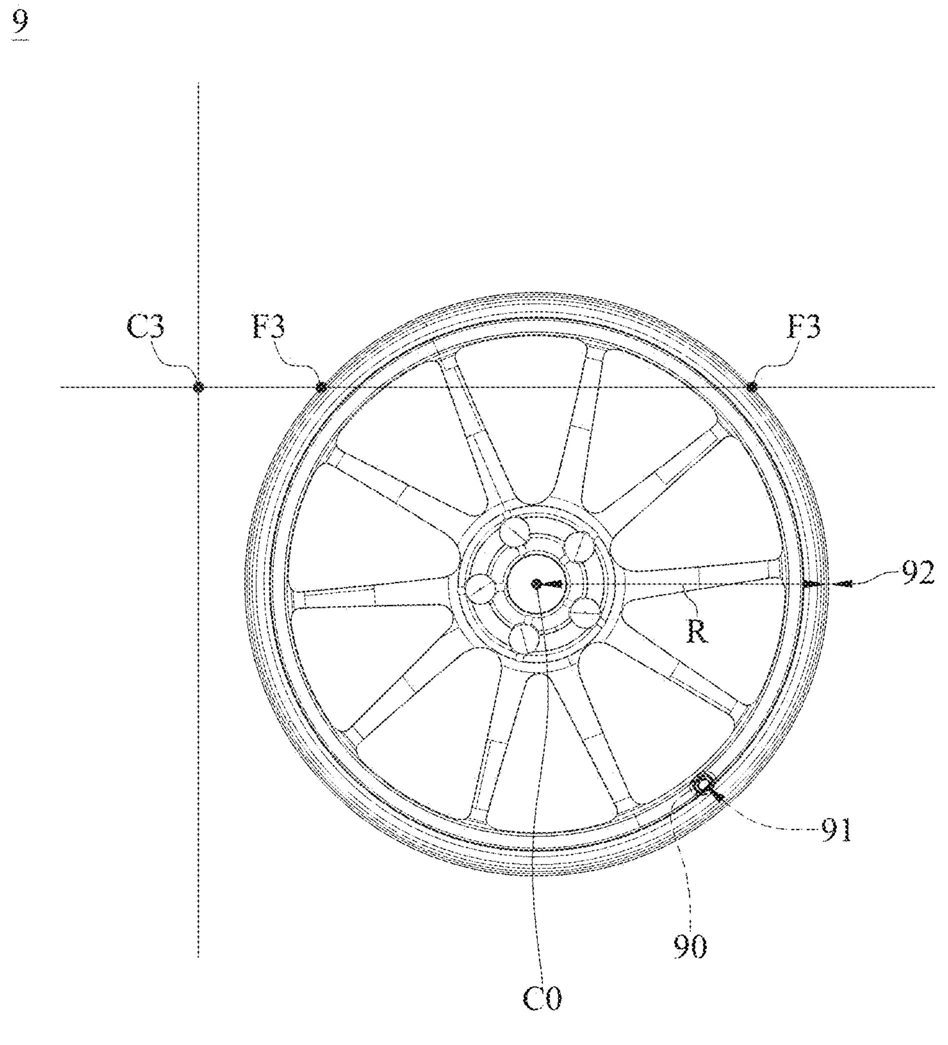
FIG. 8 is a schematic top view of a wheel blank.
Figure 9:
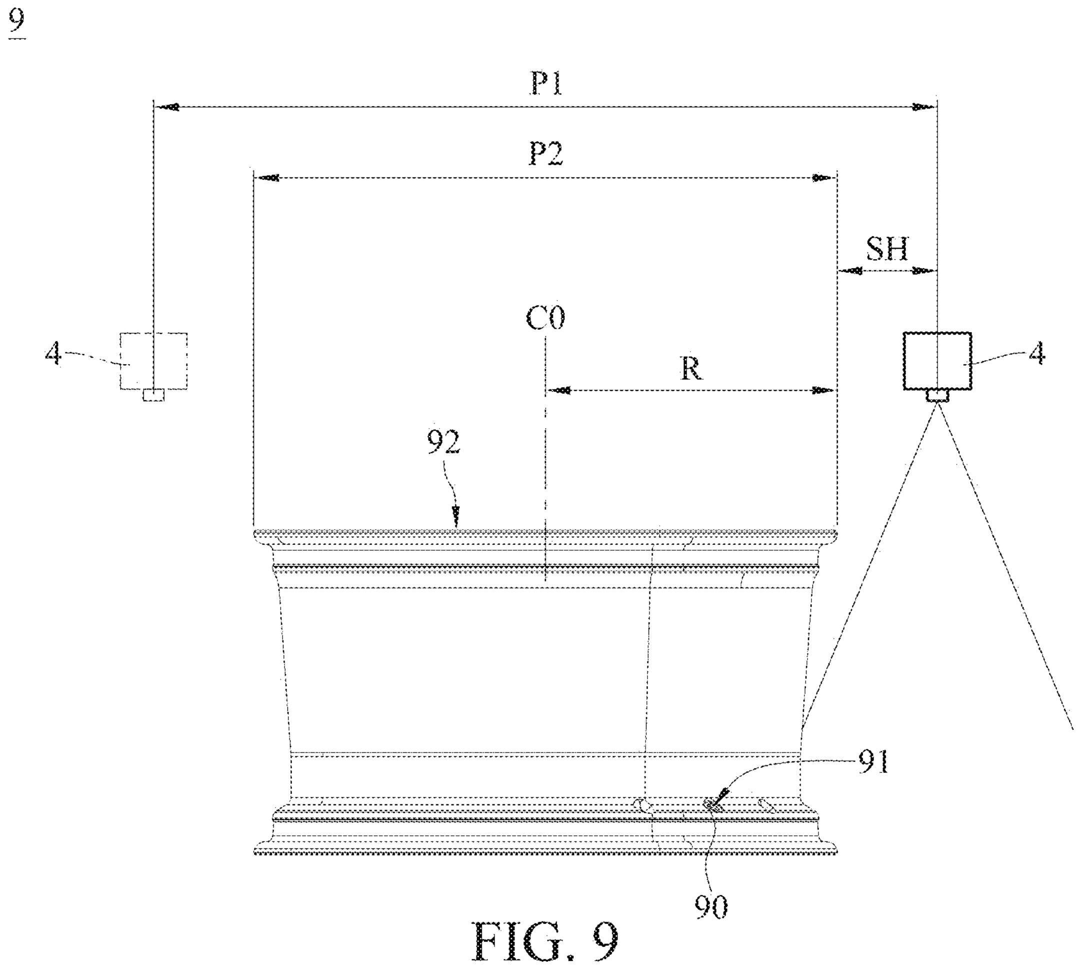
FIG. 9 is a schematic front view of the wheel blank in FIG. 6.
Figure 10:
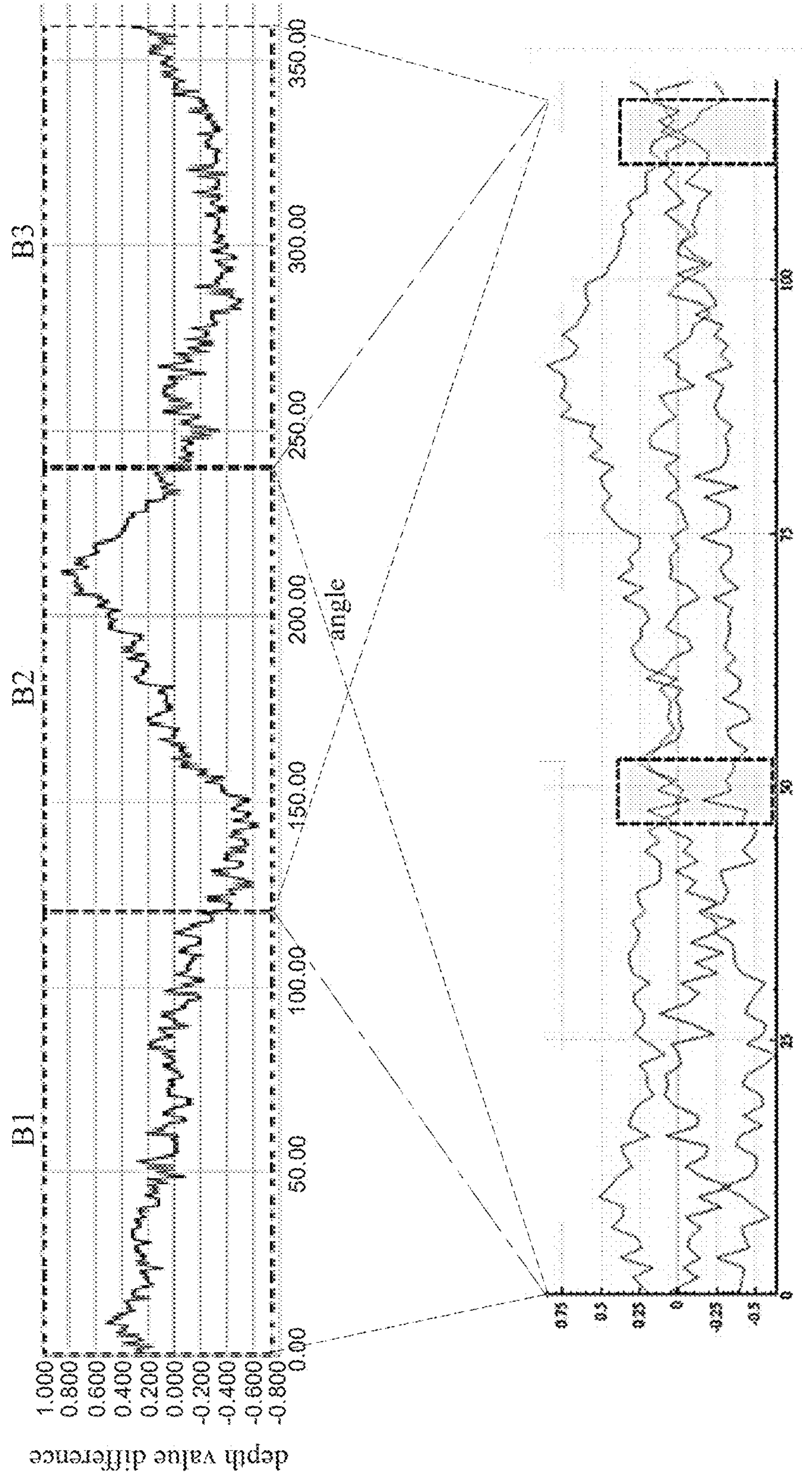
FIG. 10 is a schematic diagram of depth value differences of the wheel blank in FIG. 6 relative to positions.
Figure 11:
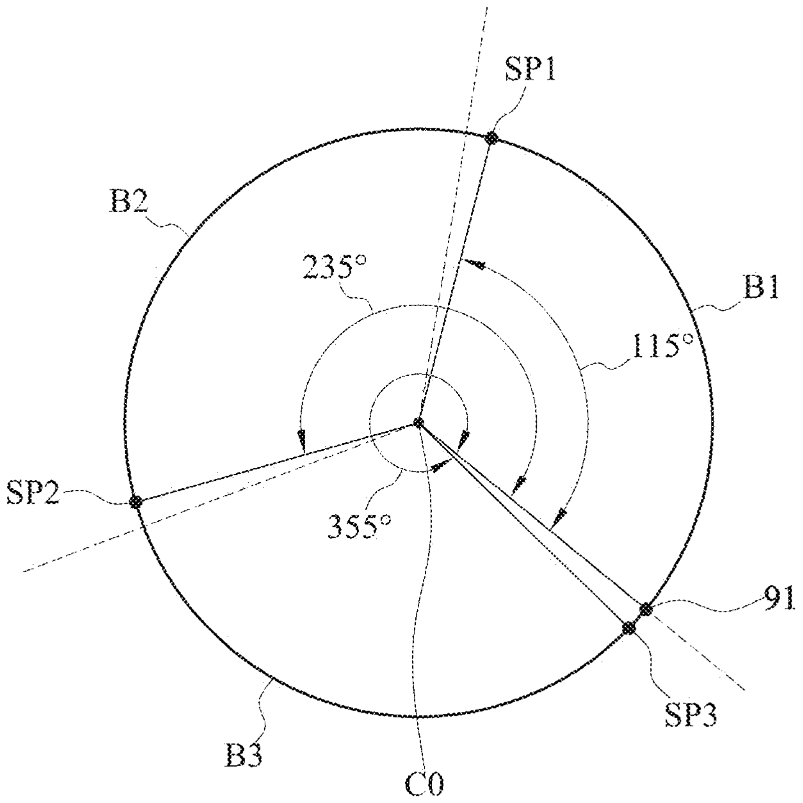
FIG. 11 is a schematic top view of load points of the wheel blank in FIG. 6.
Figure 12:
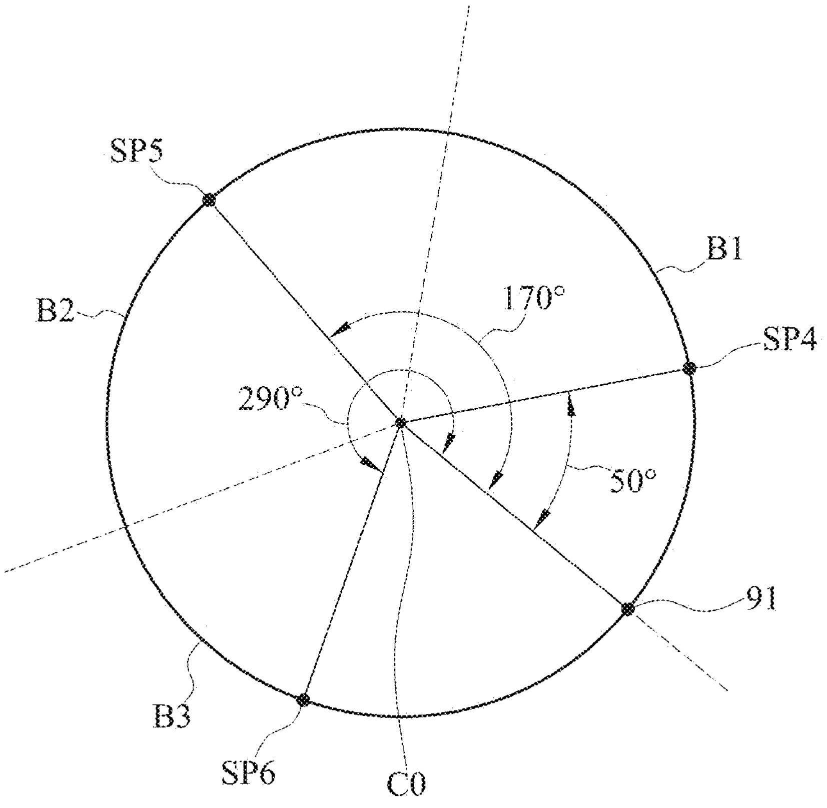
FIG. 12 is a schematic top view of sub load points of the wheel blank in FIG. 6.

Please refer to FIG. 2, FIG. 4 to FIG. 12, and a wheel blank inspection method is described. FIG. 5 is a flow chart of a wheel blank inspection method executed by the wheel blank inspection device shown in FIG. 4. FIG. 6 is a schematic top view of a wheel blank. FIG. 7 is a schematic top view of a wheel blank. FIG. 8 is a schematic top view of a wheel blank. FIG. 9 is a schematic front view of the wheel blank in FIG. 6. FIG. 10 is a schematic diagram of depth value differences of the wheel blank in FIG. 6 relative to places. FIG. 11 is a schematic top view of load points of the wheel blank in FIG. 6. FIG. 12 is a schematic top view of sub load points of the wheel blank in FIG. 6.

As shown in FIG. 5, the wheel blank inspection method includes a wheel blank image acquisition process S1, a model confirmation process S2, a path acquisition process S3, a reference point setting process S4, a depth measurement process S5, a load point localization process S6 and a transmission process S7. First, as shown in FIG. 2, the wheel blank 9 is placed in the frame 1.

As shown in FIG. 2, FIG. 4 and FIG. 5, in the wheel blank image acquisition process S1, the computing control module 6 controls the overhead camera 2 to capture an image of the wheel blank 9.

As shown in FIG. 4 and FIG. 5, in the model confirmation process S2, the computing control module 6 determines and obtains one of the wheel models corresponding to the wheel blank 9 based on the image obtained in the wheel blank image acquisition process S1 and the model information stored in the storage module 7 (in other words, the computing control module 6 cross-references the image obtained in the wheel blank image acquisition process S1 with model information stored in the storage module 7), but the disclosure is not limited thereto. In other embodiments, when all of the wheel blanks 9 are the same wheel model on a production line, the wheel blank image acquisition process S1 and the model confirmation process S2 may be omitted.

In this embodiment, as shown in FIG. 2, FIG. 4 and FIG. 5, in the path acquisition process S3, the computing control module 6 drives the motion module 3 to make the depth sensor 5 perform a cross movement and scan depth values of the wheel blank 9 at the same time. The depth values represent distances from the depth sensor 5 to the wheel blank 9. A position with the largest depth value is set as the position where a cross of the cross movement overlaps the flange 92. As shown in FIG. 6, when a projection C1 from an intersection point of the cross to the flange 92 is located on the flange 92, four positions where the cross overlaps the flange 92 are set as fitting positions F1 of the flange 92.

As shown in FIG. 7, when a projection C2 from the intersection point of the cross to the flange 92 is located on the flange 92, three positions where the cross overlaps the flange 92 are set as fitting positions F2 of the flange 92. Furthermore, when the projection C2 from the intersection point of the cross to the flange 92 is located on the flange 92, there is still a small possibility that the number of the fitting positions F2 is less than three. At this time, the position of the cross movement may be assisted in adjusting through the image obtained in the wheel blank image acquisition process S1 and the model information further obtained until the projection from the intersection point of the cross to the flange 92 is located on the flange 92.

As shown in FIG. 8, when a projection C3 from the intersection point of the cross to the flange 92 is located outside the flange 92, there is a possibility that the number of the fitting positions F3 is less than three. At this time, the position of the cross movement may be assisted in adjusting through the image obtained in the wheel blank image acquisition process S1 and the model informations further obtained until the projection from the intersection point of the cross to the flange 92 is located on the flange 92. Furthermore, when the projection C3 from the intersection point of the cross to the flange 92 is located outside the flange 92, there is still a small possibility that the number of the fitting positions F3 is four, and a subsequent calculation may be directly performed.

In short, when the number of fitting positions F2, F3 is less than three, the position of the cross movement may be assisted in adjusting through the image obtained in the wheel blank image acquisition process S1 and the model information further obtained until the projection from the intersection point of the cross to the flange 92 is located on the flange 92, but the disclosure is not limited thereto. In other embodiments, when the diameter of the flange 92 is larger than half of an extending length of the first direction rail 31 and larger than half of an extending length of the second direction rail 32, locating the intersection point of the cross at half of the extending length of the first direction rail 31 and half of the extending length of the second direction rail 32 may obtain four fitting positions F1, F3, and the step of assisting in adjusting the position of the cross motion through the image obtained in the wheel blank image acquisition process S1 may be omitted.

In this embodiment, the computing control module 6 obtains the at least three fitting positions F1, F2, F3 of the flange 92. As shown in FIG. 6 and FIG. 9, the computing control module 6 obtains a center C0 and a radius R fitted to the flange 92 according to the fitting positions F1 and through calculation methods such as triangular circumscribed circles, quadrilateral circumscribed circles, and distance calculations from three-dimensional space points to a plane, and obtains at least one detection path according to the center C0. The at least one detection path includes a first detection path P1 and a second detection path P2. In this embodiment, the computing control module 6 obtains a first detection path P1 according to information such as the center C0, a relative relationship between the valve hole and the axis stored in the storage module 7 and the field of view of the vision sensor 4, and obtains a second detection path P2 according to the center C0 and the distance between the flange and the axis stored in the storage module 7. Specifically, the first detection path P1 is a circular path rotated into a circle with the center C0 as the rotation axis and a sum of the radius R and the shift offset SH as the rotation radius, and the second detection path P2 is a circular path rotated into a circle with the center C0 as the rotation axis and the radius R as the rotation radius. Further, the shift offset SH is derived from the center C0, the relative relationship between the valve hole and the axis stored in the storage module 7 and the field of view of the vision sensor 4. The shift offset SH is set so that the vision sensor 4 may image the valve hole along the first detection path P1. The shift offset SH may be obtained through calculation or read from the storage module 7.

In other embodiments, the wheel blank image acquisition process S1 and the model confirmation process S2 may be performed after the path acquisition process S3. The motion module 3 is driven by the computing control module 6, so that the vision sensor 4 performs a circular movement relative to the wheel blank 9 according to the second detection path P2 and senses the image of the wheel blank 9 to perform the wheel blank image acquisition process S1 and the model confirmation process S2.

In this embodiment, as shown in FIG. 2, FIG. 4 and FIG. 5, in the reference point setting process S4, the motion module 3 is driven by the computing control module 6, so that the vision sensor 4 performs a circular movement relative to the wheel blank 9 according to the first detection path P1 and scans the wheel blank 9, thereby setting a reference point 91 of the wheel blank 9. As shown in FIG. 6, a valve hole 90 of the wheel blank 9 is set as the reference point 91. As shown in FIG. 9, the valve hole may not be sensible from directly above in certain shapes of the wheel blank 9. In this situation, the computing control module 6 uses the center C0 as the rotation axis and the sum of the radius R and the shift offset SH as the rotation radius according to the center C0 and the radius R and through the assistance of the shift offset SH in the model information, so that the vision sensor 4 performs the circular movement relative to the wheel blank 9 and scans the wheel blank 9, but the disclosure is not limited thereto. In other embodiments, when the wheel blank 9 has no valve hole, a mark painted or attached on the wheel blank 9 may also be set as the reference point.

In this embodiment, as shown in FIG. 2, FIG. 4 and FIG. 5, in the depth measurement process S5, the motion module 3 is driven by the computing control module 6, so that the depth sensor 5 performs the circular movement relative to the wheel blank 9 according to the second detection path P2 and scans the flange 92 to capture a plurality of depth values of the flange 92. A focusing range of the depth sensor 5 may be concentrated near the depth of the flange 92, thereby improving the identification accuracy. The computing control module 6 may assist in focusing a depth sensing range of the depth sensor 5 by using the depth of the flange 92 of the model information. Thereby, as shown in an upper part of FIG. 10, the plurality of depth value differences of the flange 92 corresponding to the plurality of depth values from 0 to 360 degrees minus the depth of the flange 92 in the model information may be plotted.

In the reference point setting process S4 and the depth measurement process S5, the vision sensor 4 and the depth sensor 5 perform the circular movement relative to the wheel blank 9 with the motion module 3, but not rotate the wheel blank 9. The wheel blank 9 may vibrate when the rotation axis does not align with a center of gravity of the wheel blank 9. Therefore, in this embodiment, the vibration may be prevented by having the vision sensor 4 and the depth sensor 5 perform the circular movement relative to the wheel blank 9.

In addition, the reference point setting process S4 may be performed before the depth measurement process S5. Comparing the reference point setting process S4 to the depth measurement process S5, the reference point setting process S4 involves an analysis operation on a plurality of images, so the calculation amount is relatively large, while the depth measurement process S5 involves numerical extraction, and the calculation amount is relatively small. Therefore, after the wheel blank 9 is scanned in the reference point setting process S4, the sensing of the depth measurement process S5 may be performed immediately, even when the analysis operation on the image are performed and the setting of the reference point 91 has not been completed. Thereby, the total time required for the reference point setting process S4 and the depth measurement process S5 may be reduced.

As shown in FIG. 4, FIG. 5 and FIG. 6, in the load point localization process S6, the computing control module 6 obtains a plurality of load points according to the plurality of depth values and obtains information of a plurality of relative positions of the plurality of load points with respect to a reference point 91. The number of the load points is three or more. For example, the number of the load points is N. The second detection path P2 is divided into N sections, and each of the N sections comprises M positions uniformly distributed in each of the N sections. The number of the depth values is N×M, and the plurality of depth values correspond to 1st to Mth positions of each of the N sections respectively. 1st to Mth differential degrees of the plurality of depth values on the plurality of 1st to Mth positions are calculated, smallest differential degrees are obtained from the plurality of differential degrees, and the plurality of positions corresponding to the smallest differential degrees are set as the plurality of load points. More specifically, a 1st differential degree of N of the depth values corresponding to the 1st positions in the N sections are calculated, a 2nd differential degree of N of the depth values corresponding to the 2nd positions in the N sections are calculated, until a Mth differential degree of N of the depth values corresponding to the Mth positions in the N sections are calculated. The smallest differential degree are obtained from the M differential degrees, and the positions corresponding to the smallest differential degree are set as the plurality of load points.

As shown in FIG. 10 and FIG. 11, a line connecting the reference point 91 to the center C0 is set to 0 degree, a total of 360 depth values are captured from 1 to 360 degrees according to the second detection path P2, and the plurality of depth value differences that the plurality of depth values minus the depth of the flange 92 in the model information are plotted. That is, the assistance is performed by using the depth of the flange 92 of the model information. N is equal to 3, and M is equal to 120. The 1st to 120th depth value differences are distributed to the first section B1, the 121st to 240th depth value differences are distributed to the second section B2, and the 241st to 360th depth value differences are distributed to the third section B3. As shown in a lower part of FIG. 10, the depth value differences of the three sections B1, B2, B3 overlap.

As shown in FIG. 10 and FIG. 11, "a root mean square of the three depth value differences" of the depth value difference of the first position of the first section B1, the depth value difference of the first position of the second section B2 and the depth value difference of the first position of the third section B3 is set as the first differential degree. "A root mean square of the three depth value differences" of the depth value difference of the second position of the first section B1, the depth value difference of the second position of the second section B2 and the depth value difference of the second position of the third section B3 is set as the second differential degree. By analogy, the calculation continues until that "a root mean square of the three depth value differences" of the depth value difference of the 120th position of the first section B1, the depth value difference of the 120th position of the second section B2 and the depth value difference of the 120th position of the third section B3 is set as the 120th differential degree. As shown in the lower part of FIG. 10, the differential degrees of the depth values near the 115th position are the smallest. Therefore, the 115th position, the 115+120th position of an entire circle (i.e., the 235th position), and the 115+120+120th position of the entire circle (i.e., the 355th position) are determined as the plurality of load points SP1, SP2, SP3. Since the differential degrees of the depth values are smallest, an inclination of the wheel blank 9 may be minimized when the load points is subsequently loaded by a bearing fixture of a processing machine.

As shown in FIG. 11, lines connecting each of the load point SP1, SP2 or SP3 to the center C0 individually each forms an angle with a line connecting the reference point 91 to the center C0. These angles are set as information of relative positions. In this embodiment, the information of relative positions is 115°, 235°, 355°.

In addition, as shown in FIG. 10 and FIG. 12, the depth value near the 50th position has the second smallest difference. Therefore, the 50th position, the 50+120th position of the entire circle (i.e., the 170th position), and the 50+120+120th position of the entire circle (i.e., the 290th position) may also be determined as a plurality of sub load points SP4, SP5, SP6, serving as backup. The information of the sub relative positions is 50°, 170°, 290°.

In this embodiment, although "the root mean square of the three depth value differences" is set as the differential degrees, the disclosure is not limited thereto. In other embodiments, "a difference that the largest value minus the smallest value among the three depth values" may also be set as the differential degrees. In other embodiments, "a standard deviation of the three depth values" may also be set as the differential degrees.

In this embodiment, as shown in FIG. 5, in the transmission process S7, the computing control module 6 transmits the information of the relative positions and the sub relative positions to the subsequent processing machine and moves the wheel blank 9 to the processing machine. The processing machine may put the load points of the wheel blank 9 correspondingly on the bearing fixture of the processing machine through the information of the relative positions or the sub relative positions, so that the inclination of the wheel blank 9 may be minimized.

Figure 13:
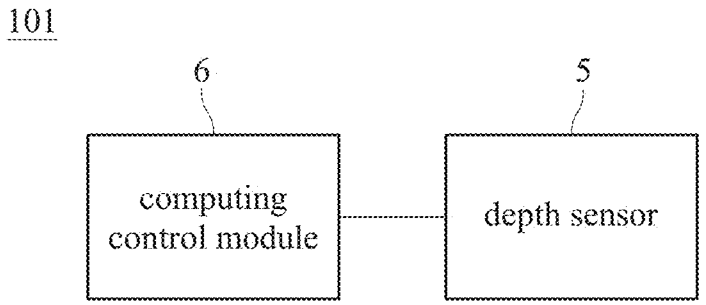
FIG. 13 is a schematic block diagram of a wheel blank inspection device according to another embodiment of the disclosure.
Figure 14:
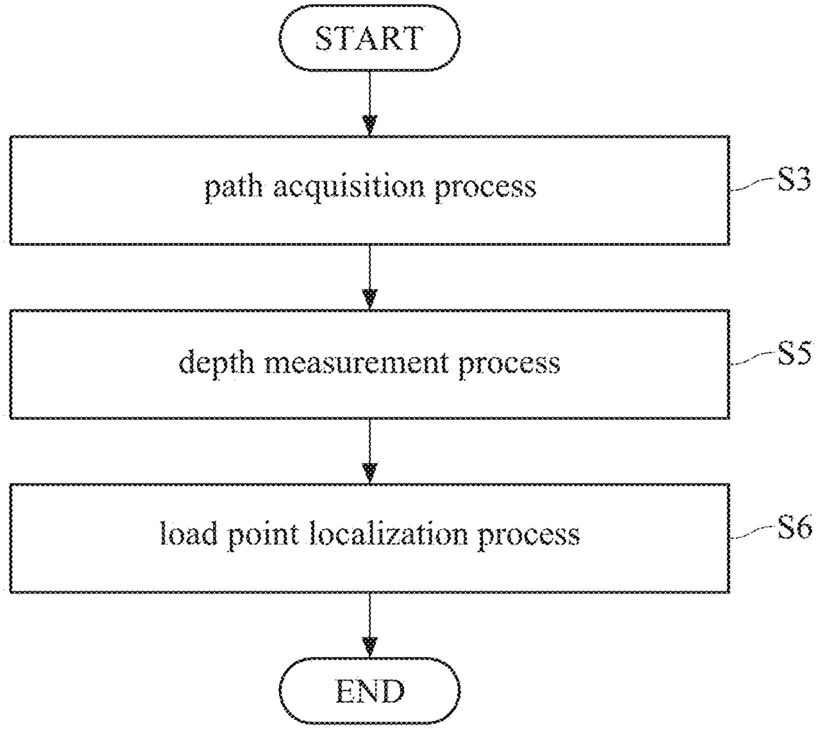
FIG. 14 is a flow chart of a wheel blank inspection method executed by the wheel blank inspection device shown in FIG. 13.

Please refer to FIG. 13 and FIG. 14. FIG. 13 is a schematic block diagram of a wheel blank inspection device according to another embodiment of the disclosure. FIG. 14 is a flow chart of a wheel blank inspection method executed by the wheel blank inspection device shown in FIG. 13.

As shown in FIG. 13 and FIG. 14, the wheel blank inspection device 101 includes a depth sensor 5 and a computing control module 6 electrically connected to the depth sensor 5.

In this embodiment, the position of a reference point of a wheel blank is fixed; that is, the computing control module 6 has been preset information of a reference point. In this situation, the processes to be executed may be further simplified compared to the embodiment of FIG. 5. Therefore, the computing control module 6 of this embodiment is configured to execute a path acquisition process S3, a depth measurement process S5 and a load point localization process S6.

In the path acquisition process S3, the computing control module 6 controls the depth sensor 5 to scan the wheel blank to obtain a center fitted to a flange of the wheel blank, thereby calculating at least one detection path based on the center. The method of obtaining the center of the flange and the calculating principle of the detection path in this embodiment are the same as those in the aforementioned embodiment.

In the depth measurement process S5, the computing control module 6 controls the depth sensor 5 to scan the flange of the wheel blank according to at least one detection path to capture a plurality of depth values of the flange. One of the at least one detection path in this embodiment is the second detection path P2 in the aforementioned embodiment. The execution content of the depth measurement process S5 in this embodiment is the same as that in the aforementioned embodiment.

In the load point localization process S6, the computing control module 6 computes and obtains a plurality of load points and information of a plurality of relative positions of the load points with respect to a reference point of the wheel blank according to the depth values. In this embodiment, information of the reference point may be preset and stored in a built-in memory of the computing control module 6, but it may also be stored in advance in an independent memory that may be accessed by the computing control module 6. The execution content of the load point localization process S6 in this embodiment is the same as that in the aforementioned embodiment.

In the situations of determining various types of wheel blanks, the wheel blank image acquisition process S1, the model confirmation process S2 and the transmission process S7 in the embodiment of FIG. 5 may also be further added, and the overhead camera 2 of the embodiment in FIG. 4 may also be added.

As discussed above, in the wheel blank inspection device in one embodiment of the disclosure, through obtaining the plurality of load points according to the depth values obtaining the information of the plurality of relative positions of the load points with respect to the reference point, so that when the wheel blank is subsequently refined and processed, the wheel blank may be placed according to the information of the relative positions of the load points with respect to the reference point. In this way, the wheel blank is placed less inclined, which may prevents subsequent processing tools from colliding with the wheel blank, thereby preventing accidental damage to the tools. Furthermore, the wheel blank inspection device in an embodiment of this disclosure may use the motion module to have the vision sensor and the depth sensor perform circular movement relative to the wheel blank, instead of making the wheel blank rotate. This may prevent vibrations that may occur if the rotation axis does not align with the center of gravity of the wheel blank during rotation of the wheel blank. In addition, the depth sensor may use a camera with fewer pixels than those of the vision sensor for imaging small areas, thereby reducing the cost of the wheel blank inspection device. A focusing range of the depth sensor may be concentrated near the depth of the flange, thereby improving the identification accuracy.

Although the disclosure is disclosed in the foregoing embodiments, it is not intended to limit the disclosure. All variations and modifications made without departing from the spirit and scope of the disclosure fall within the scope of the disclosure. For the scope defined by the disclosure, please refer to the attached claims.

What is claimed is:

1. A wheel blank inspection device for inspecting a wheel blank, the wheel blank inspection device comprising a depth sensor and a computing control module electrically connected to the depth sensor, wherein the computing control module is configured to execute:

a path acquisition process, controlling the depth sensor to scan the wheel blank, obtaining a center fitted to a flange of the wheel blank, and calculating at least one detection path based on the center;

a depth measurement process, controlling the depth sensor to scan the flange of the wheel blank according to the at least one detection path to capture a plurality of depth values of the flange; and a load point localization process, obtaining a plurality of load points and information of a plurality of relative positions of the plurality of load points with respect to a reference point of the wheel blank based on the depth values.

2. The wheel blank inspection device according to claim 1, further comprising a vision sensor electrically connected to the computing control module, wherein the at least one detection path comprises a first detection path and a second detection path, and the computing control module is configured to further execute:

a reference point setting process, controlling the vision sensor to scan the wheel blank according to the first detection path, thereby setting the reference point of the wheel blank, wherein in the depth measurement process, the depth sensor is controlled to scan the flange according to the second detection path.

3. The wheel blank inspection device according to claim 2, further comprising a motion module, wherein the vision sensor and the depth sensor are disposed on the motion module, the computing control module is electrically connected to the motion module, and the computing control module is configured to drive the motion module to move the vision sensor and the depth sensor.

4. The wheel blank inspection device according to claim 3, wherein the motion module comprises a first direction rail, a second direction rail and a movement base, the second direction rail is disposed on the first direction rail and slidable along the first direction rail, the movement base is disposed on the second direction rail and slidable along the second direction rail, and the vision sensor and the depth sensor are disposed on the movement base.

5. The wheel blank inspection device according to claim 3, further comprising a frame, wherein the motion module is disposed on the frame, the frame is for accommodating the wheel blank, and the computing control module is configured to drive the motion module to move the vision sensor and the depth sensor with respect to the frame.

6. The wheel blank inspection device according to claim 2, wherein in the path acquisition process, the depth sensor is controlled to perform a cross movement to obtain at least three fitting positions of the flange, the center and a radius of the flange are obtained based on the at least three fitting positions, and the first detection path and the second detection path are obtained based on the center.

7. The wheel blank inspection device according to claim 6, wherein a number of the at least three fitting positions is four.

8. The wheel blank inspection device according to claim 6, wherein a plurality of angles are formed between the reference point and each of the plurality of load points with respective to the center, and the angles are set as the information of the plurality of relative positions.

9. The wheel blank inspection device according to claim 2, wherein in the reference point setting process, a valve hole of the wheel blank is set as the reference point.

10. The wheel blank inspection device according to claim 2, wherein in the reference point setting process, a mark painted or attached on the wheel blank is set as the reference point.

11. The wheel blank inspection device according to claim 2, wherein in the load point localization process, a number of the plurality of load points is N, the second detection path is divided into N sections, each of the N sections comprises M positions, a number of the depth values is N×M, the depth values correspond to the 1st to Mth positions of each of the N sections respectively, a 1st differential degree of N of the depth values corresponding to the 1st positions are calculated, a 2nd differential degree of N of the depth values corresponding to the 2nd positions are calculated, until a Mth differential degree of N of the depth values corresponding to the Mth positions are calculated, smallest differential degree are obtained from the M differential degrees, and the positions corresponding to the smallest differential degree are set as the plurality of load points.

12. The wheel blank inspection device according to claim 2, wherein a number of the plurality of load points is three or more.

13. The wheel blank inspection device according to claim 2, further comprising a storage module, wherein the computing control module is electrically connected to the storage module, and the storage module stores model information of a plurality of wheel models.

14. The wheel blank inspection device according to claim 13, wherein the computing control module is further configured to execute a model confirmation process before the path acquisition process, and in the model confirmation process, the wheel blank is sensed to identify the model information of one of the plurality of wheel models corresponding to the wheel blank.

15. The wheel blank inspection device according to claim 14, further comprising an overhead camera, wherein the computing control module is electrically connected to the overhead camera, and in the model confirmation process, the computing control module controls the overhead camera to capture an image of the wheel blank, and the computing control module determines and obtains one of the plurality of wheel models corresponding to the wheel blank based on the image and the model information stored in the storage module.

16. The wheel blank inspection device according to claim 14, wherein in the path acquisition process, the first detection path and the second detection path are obtained with assistance of the model information of the one of the plurality of wheel models corresponding thereto.

17. The wheel blank inspection device according to claim 14, wherein in the reference point setting process, the reference point is set with assistance of the model information of the one of the plurality of wheel models corresponding thereto.

18. The wheel blank inspection device according to claim 14, wherein in the depth measurement process, the depth values are captured with assistance of the model information of the one of the plurality of wheel models corresponding thereto.

19. The wheel blank inspection device according to claim 14, wherein in the load point localization process, the plurality of load points and the information of the plurality of relative positions are obtained with assistance of the model information of the one of the plurality of wheel models corresponding thereto.

20. The wheel blank inspection device according to claim 2, wherein the computing control module is configured to further execute a transmission process, and the transmission process comprising transmitting the information of the plurality of relative positions to a processing machine and moving the wheel blank to the processing machine.

* * * * *